(12) United States Patent
Kinoshita (10) Patent No.: US 10,710,576 B2
(45) Date of Patent: Jul. 14, 2020

(54) VEHICLE CONTROL APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 215 days.

(21) Appl. No.: 15/967,334

(22) Filed: Apr. 30, 2018

(65) Prior Publication Data

US 2018/0370524 A1 Dec. 27, 2018

(30) Foreign Application Priority Data

Jun. 26, 2017 (JP) .................................. 2017-124009

(51) Int. Cl.
| | |
|---|---|
| *B60W 30/02* | (2012.01) |
| *B60W 10/06* | (2006.01) |
| *B60W 10/20* | (2006.01) |
| *B60W 10/08* | (2006.01) |
| *B60K 6/485* | (2007.10) |
| *B60W 50/00* | (2006.01) |

(52) U.S. Cl.
CPC ............. *B60W 30/02* (2013.01); *B60K 6/485* (2013.01); *B60W 10/06* (2013.01); *B60W 10/08* (2013.01); *B60W 10/20* (2013.01); *B60W 2050/0004* (2013.01)

(58) Field of Classification Search
CPC ...... B60W 30/02; B60W 10/06; B60W 10/20; B60W 10/08; B60W 2050/0004; B60K 6/485; B60L 7/10; B60L 58/20; B60L 3/0046; B60L 50/61; B60L 3/0061

USPC ............................................................ 701/1
See application file for complete search history.

(56) References Cited

U.S. PATENT DOCUMENTS

2017/0197567 A1    7/2017 Iwasaki et al.

FOREIGN PATENT DOCUMENTS

| JP | 2004-248458 A |   | 9/2004 |
|---|---|---|---|
| JP | 2004248458 A | * | 9/2004 |
| JP | 2013-256267 A |   | 12/2013 |

(Continued)

OTHER PUBLICATIONS

Japanese Office Action, dated Oct. 23, 2019, in Japanese Application No. 2017-124009 and English Translation thereof.

(Continued)

*Primary Examiner* — Maceeh Anwari
(74) *Attorney, Agent, or Firm* — McGinn I.P. Law Goup, PLLC (57) ABSTRACT

A vehicle control apparatus to be mounted on a vehicle including an engine includes a first power supply system, a second power supply system, a switch, and a switch controller. The first power supply system includes a first electricity storage device and an electric load. The second power supply system includes an electric motor and a second electricity storage device. The switch controller is configured to control the switch to a cutoff state on the condition that the electric motor is controlled to a powering state to bring the engine to starting rotation from a stopped state. The switch controller is configured to control the switch to an electrically conductive state on the condition that the electric motor is controlled to the powering state to bring the engine to an assisted drive from a rotating state.

13 Claims, 10 Drawing Sheets

(56) References Cited

FOREIGN PATENT DOCUMENTS

| JP | 2015-061442 A |   | 3/2015 |
|----|---------------|---|--------|
| JP | 2016-022774 A |   | 2/2016 |
| JP | 2016-193632 A |   | 11/2016 |
| JP | 2016193632 A | * | 11/2016 |

OTHER PUBLICATIONS

Japanese Office Action, dated Mar. 5, 2019, in Japanese Application No. 2017-124009 and English Translation thereof.

* cited by examiner

VEHICLE CONTROL APPARATUS

CROSS-REFERENCE TO RELATED APPLICATIONS

The present application claims priority from Japanese Patent Application No. 2017-124009 filed on Jun. 26, 2017, the entire contents of which are hereby incorporated by reference.

BACKGROUND

The technology relates to a vehicle control apparatus to be mounted on a vehicle.

As a vehicle control apparatus to be mounted on a vehicle, there has been proposed a control apparatus including an electric motor coupled to an engine. For example, reference is made to Japanese Unexamined Patent Application Publication (JP-A) No. 2013-256267. The control apparatus as described in JP-A No. 2013-256267 includes a lead battery and a lithium-ion battery, as electricity storage devices that supply electric power to the electric motor and an electric load. The lead battery and the lithium-ion battery are coupled to each other. The control apparatus as described in JP-A No. 2013-256267 releases the coupling of the lead battery to the lithium-ion battery, in powering the electric motor for engine torque assistance. This allows for appropriate electric power supply from the lead battery to the electric load, even in a case with a rapid increase in electric power supplied from the lithium-ion battery to the electric motor.

SUMMARY

An aspect of the technology provides a vehicle control apparatus to be mounted on a vehicle including an engine. The vehicle control apparatus includes a first power supply system, a second power supply system, a switch, and a switch controller. The first power supply system includes a first electricity storage device and an electric load, in which the electric load is coupled to the first electricity storage device. The second power supply system includes an electric motor and a second electricity storage device, in which the electric motor is coupled to the engine, and the second electricity storage device is coupled to the electric motor. The switch is configured to be controlled to an electrically conductive state and a cutoff state. The electrically conductive state includes coupling the first power supply system and the second power supply system to each other. The cutoff state includes isolating the first power supply system and the second power supply system from each other. The switch controller is configured to control the switch to the electrically conductive state and the cutoff state, on the basis of an operation state of the electric motor. The switch controller is configured to control the switch to the cutoff state on the condition that the electric motor is controlled to a powering state to bring the engine to starting rotation from a stopped state. The switch controller is configured to control the switch to the electrically conductive state on the condition that the electric motor is controlled to the powering state to bring the engine to an assisted drive from a rotating state.

An aspect of the technology provides a vehicle control apparatus to be mounted on a vehicle including an engine. The vehicle control apparatus includes a first power supply system, a second power supply system, a switch, and circuitry. The first power supply system includes a first electricity storage device and an electric load, in which the electric load is coupled to the first electricity storage device. The second power supply system includes an electric motor and a second electricity storage device, in which the electric motor is coupled to the engine, and the second electricity storage device is coupled to the electric motor. The switch is configured to be controlled to an electrically conductive state and a cutoff state. The electrically conductive state includes coupling the first power supply system and the second power supply system to each other. The cutoff state includes isolating the first power supply system and the second power supply system from each other. The circuitry is configured to control the switch to the electrically conductive state and the cutoff state, on the basis of an operation state of the electric motor. The circuitry is configured to control the switch to the cutoff state on the condition that the electric motor is controlled to a powering state to bring the engine to starting rotation from a stopped state. The circuitry is configured to control the switch to the electrically conductive state on the condition that the electric motor is controlled to the powering state to bring the engine to an assisted drive from a rotating state.

DETAILED DESCRIPTION

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid redundant description.

A control apparatus as described in JP-A No. 2013-256267 prohibits an electric motor from performing torque assistance accompanied by cancellation of battery coupling, in a case where a failure in a current sensor hinders a discharge state of a lead battery from being grasped. This makes it possible to maintain the coupling of the lead battery to a lithium-ion battery, allowing for appropriate functioning of the control apparatus by electric power supply from the lithium-ion battery even in a case with occurrence of an abnormality in the lead battery. However, the appropriate functioning of the control apparatus has been still difficult in a case with the occurrence of the abnormality in the lead battery, with the electric motor executing the torque assistance, i.e., with the lead battery and the lithium-ion battery being isolated.

It is desirable to provide a vehicle control apparatus that is able to function appropriately, even in a case with occurrence of an abnormality in an electricity storage device.

Figure 1:
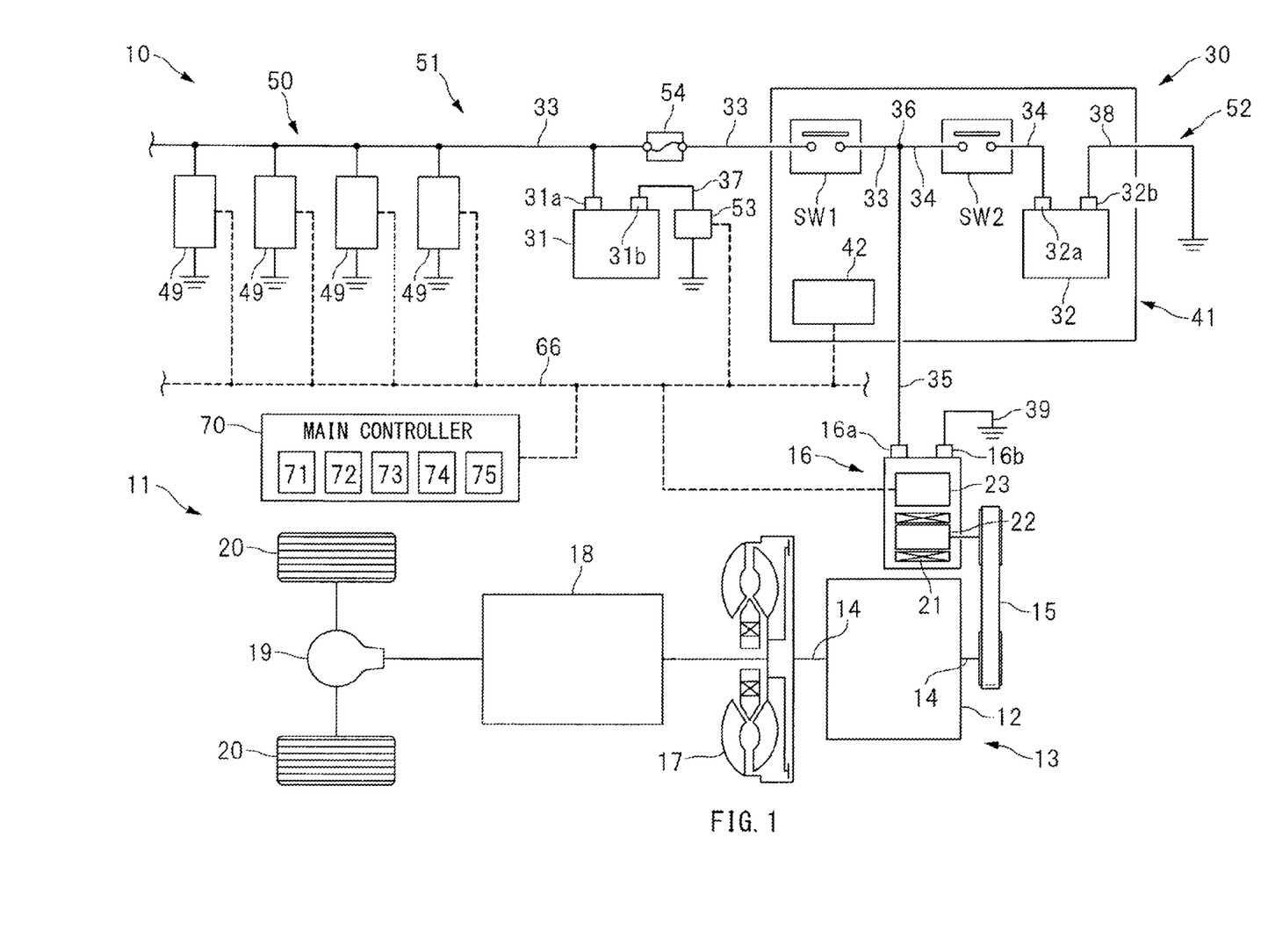
FIG. 1 schematically illustrates a configuration example of a vehicle provided with a vehicle control apparatus according to one implementation of the technology.

FIG. 1 is a schematic diagram illustrating a configuration example of a vehicle 11 provided with a vehicle control apparatus 10 according to an example implementation of the technology. Referring to FIG. 1, on the vehicle 11, the vehicle control apparatus 10 according to this implementation is mounted. Moreover, on the vehicle 11, a power unit 13 may be mounted. The power unit 13 may include an engine 12 that serves as a power source. The engine 12 may include a crankshaft 14 to which a starter generator 16 is mechanically coupled via a belt mechanism 15. To the engine 12, a transmission mechanism 18 may also be coupled via a torque converter 17. To the transmission mechanism 18, wheels 20 may be coupled via, for example, a differential mechanism 19. In one implementation, the starter generator 16 may serve as an "electric motor" and a "generator motor".

The starter generator 16 is coupled to the engine 12. The starter generator 16 may be a so-called integrated starter generator (ISG) that serves both as an electric generator and an electric motor. Thus, the starter generator 16 may serve as a generator motor. That is, the starter generator 16 may serve not only as the electric generator to be driven by the crankshaft 14 but also as the electric motor that causes rotation of the crankshaft 14. The starter generator 16 may be controlled to a powering state as the electric motor, for example, in restarting the engine 12 in an idling stop control, and in performing an assistance drive of the engine 12 at the time of a start or acceleration.

The starter generator 16 may include a stator 21 having a stator coil and a rotor 22 having a field coil. The starter generator 16 may further include an ISG controller 23 in order to control an electrically conductive state of each of the stator coil and the field coil. The ISG controller 23 may include, for example, an inverter, a regulator, and a microcomputer. The ISG controller 23 may control the electrically conductive state of each of the field coil and the stator coil, thus controlling, for example, a power-generation voltage, power-generation torque, and powering torque of the starter generator 16.

[Power Supply Circuit]

Figure 2:
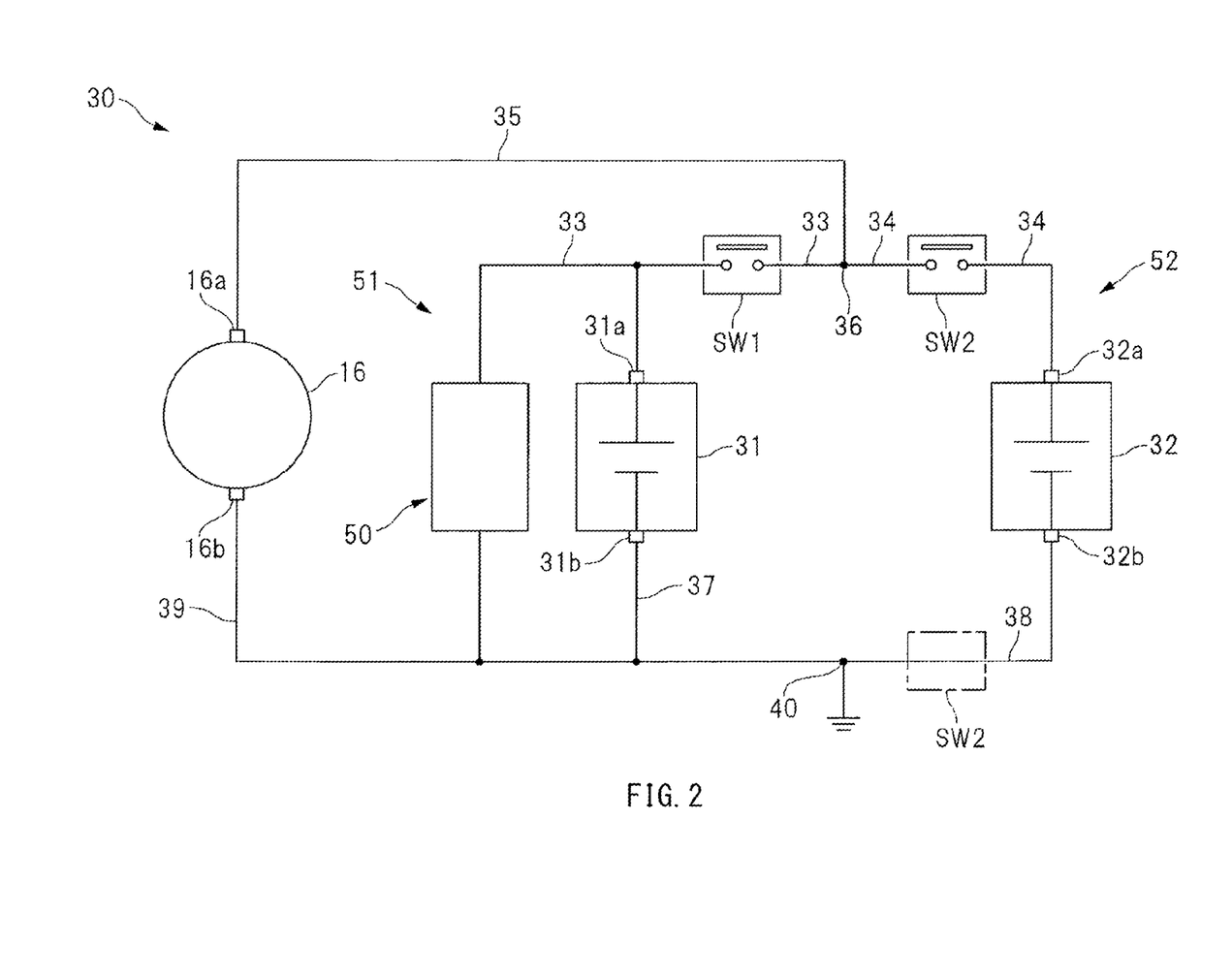
FIG. 2 is a circuit diagram illustrating an example of a power supply circuit.

A description is given of a power supply circuit 30 included in the vehicle control apparatus 10. FIG. 2 is a circuit diagram illustrating an example of the power supply circuit 30. Referring to FIG. 2, the power supply circuit 30 may include a lead battery 31 and a lithium-ion battery 32.

The lead battery 31 may be electrically coupled to the starter generator 16. The lithium-ion battery 32 may be electrically coupled to the starter generator 16, in parallel to the lead battery 31. In one implementation, the lead battery 31 may serve as a "first electricity storage device", and the lithium-ion battery 32 may serve as a "second electricity storage device". A terminal voltage of the lithium-ion battery 32 may be higher in design than a terminal voltage of the lead battery 31, in order to actively cause discharge of the lithium-ion battery 32. Further, internal resistance of the lithium-ion battery 32 may be smaller in design than internal resistance of the lead battery 31, in order to actively cause charge and the discharge of the lithium-ion battery 32.

The lead battery 31 may include a positive electrode terminal 31a coupled to a positive electrode line 33. The lithium-ion battery 32 may include a positive electrode terminal 32a coupled to a positive electrode line 34. The starter generator 16 may include a positive electrode terminal 16a coupled to a positive electrode line 35. These positive electrode lines 33 to 35 may be coupled to one another via a node 36. The lead battery 31 may include a negative electrode terminal 31b coupled to a negative electrode line 37. The lithium-ion battery 32 may include a negative electrode terminal 32b coupled to a negative electrode line 38. The starter generator 16 may include a negative electrode terminal 16b coupled to a negative electrode line 39. These negative electrode lines 37 to 39 may be coupled to one another via a reference potential point 40.

On the positive electrode line 33 of the lead battery 31, a switch SW1 may be provided. The switch SW1 may be switched between an electrically conductive state and a cutoff state. Controlling the switch SW1 to the electrically conductive state causes the starter generator 16 and the lead battery 31 to be coupled to each other. Controlling the switch SW1 to the cutoff state causes the starter generator 16 and the lead battery 31 to be isolated from each other. In one implementation, the switch SW1 may serve as a "switch". Further, on the positive electrode line 34 of the lithium-ion battery 32, a switch SW2 may be provided. The switch SW2 may be switched between an electrically conductive state and a cutoff state. Controlling the switch SW2 to the electrically conductive state causes the starter generator 16 and the lithium-ion battery 32 to be coupled to each other. Controlling the switch SW2 to the cutoff state causes the starter generator 16 and the lithium-ion battery 32 to be isolated from each other. The switch SW1 and the switch SW2 may each be a switch including a semiconductor element such as, but not limited to, a metal-oxide-semiconductor field-effect transistor (MOSFET). In an alternative implementation, the switch SW1 and the switch SW2 may each be a switch that mechanically opens and closes a contact by means of, for example, electromagnetic force. It is to be noted that the switch SW1 and the switch SW2 are each referred to as, for example, a relay or a contactor as well.

As illustrated in FIG. 1, the power supply circuit 30 may include a battery module 41. In the battery module 41, incorporated may be the lithium-ion battery 32, and the switches SW1 and SW2. The battery module 41 may further include a battery controller 42. The battery controller 42 may include, for example, a microcomputer. The battery controller 42 may have a monitoring function and a control function. Non-limiting examples of the monitoring function may include monitoring of a state of charge SOC, a charge current, a discharge current, the terminal voltage, a cell temperature, and the internal resistance of the lithium-ion battery 32. Non-limiting examples of the control function may include controlling the switches SW1 and SW2. It is to be noted that the state of charge SOC refers to a ratio of an electricity storage amount of the battery to a designed capacity of the battery.

Moreover, to the positive electrode line 33 of the lead battery 31, an electric load group 50 may be coupled. The electric load group 50 may include a plurality of electric loads 49. Non-limiting examples of the electric loads 49 that constitute the electric load group 50 may include the ISG controller 23, the battery controller 42, controllers 60, 61, 63, 65, and 70, and actuators 62 and 64. The controllers 60, 61, 63, 65, and 70, and the actuators 62 and 64 are described later. On the negative electrode line 37 of the lead battery 31, a battery sensor 53 may be provided. The battery sensor 53 may detect charge and discharge states of the lead battery 31. The battery sensor 53 may have a detection function. Non-limiting examples of the detection function may include detection of a charge current, a discharge current, the terminal voltage, a state of charge SOC of the lead battery 31. On the positive electrode line 33 of the lead battery 31, a fuse 54 may be provided. The fuse 54 may protect, for example, the electric load group 50.

As illustrated in FIGS. 1 and 2, the power supply circuit 30 includes a first power supply system 51 and a second power supply system 52. The first power supply system 51 includes the lead battery 31 and the electric load group 50 coupled to the lead battery 31. The second power supply system 52 includes the lithium-ion battery 32 and the starter generator 16 coupled to the lithium-ion battery 32. Between the first power supply system 51 and the second power supply system 52, the switch SW1 is provided. Controlling the switch SW1 to the electrically conductive state causes the first power supply system 51 and the second power supply system 52 to be coupled to each other. Controlling the switch SW1 to the cutoff state causes the first power supply system 51 and the second power supply system 52 to be isolated from each other.

[Control System]

Figure 3:
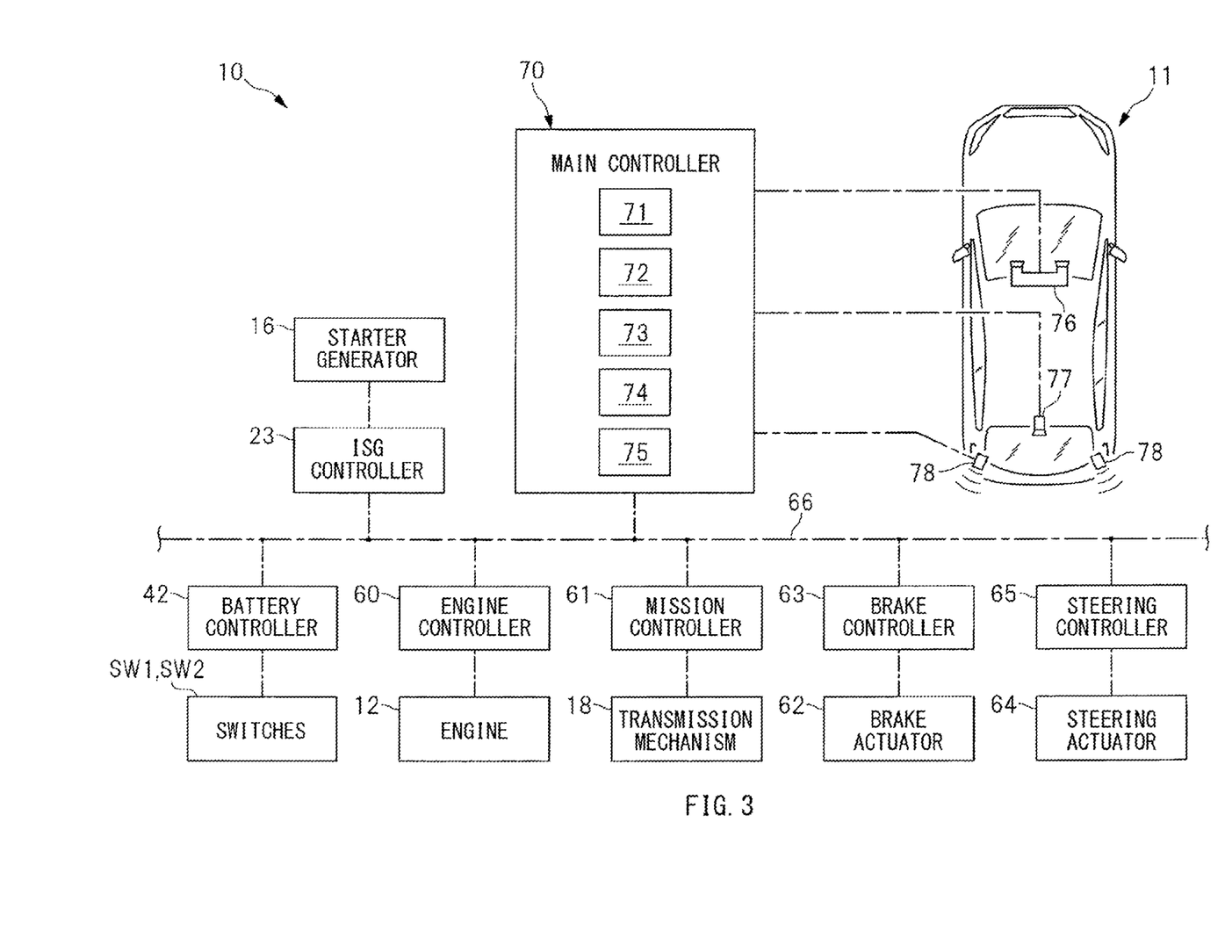
FIG. 3 is a block diagram of one example of a control system of the vehicle control apparatus.

FIG. 3 is a block diagram of an example of a control system of the vehicle control apparatus 10. Referring to FIG. 3, the vehicle control apparatus 10 may include an engine controller 60 and a mission controller 61, in addition to the ISG controller 23 and the battery controller 42 as mentioned above. The engine controller 60 may control an operation state of the engine 12. The mission controller 61 may control an operation state of the transmission mechanism 18. The vehicle control apparatus 10 may further include a brake controller 63 and a steering controller 65. The brake controller 63 may control a brake actuator 62 that adjusts braking power of each of the wheels 20. The steering controller 65 may control a steering actuator 64 that adjusts a steering angle of each of the wheels 20. The vehicle control apparatus 10 may further include a main controller 70 that synthetically control the controllers 23, 42, 60, 61, 63, and 65. The controllers 23, 42, 60, 61, 63, 65, and 70 may each include, for example, a microcomputer. The controllers 23, 42, 60, 61, 63, 65, and 70 may be so coupled to one another as to be able to perform a communication mutually and freely via an on-vehicle network 66. Non-limiting examples of the on-vehicle network 66 may include a controller area network (CAN) and a local interconnect network (LIN).

Moreover, the main controller 70 may include functional units that control, for example, the power unit 13 and the power supply circuit 30. Non-limiting examples of the functional units provided in the main controller 70 may include an ISG control unit 71, a switch control unit 72, an abnormality detector 73, an idling stop control unit 74, and an automatic operation control unit 75. The ISG control unit 71 may control the starter generator 16. The switch control unit 72 may control the switches SW1 and SW2. The abnormality detector 73 may detect an abnormal state of the lead battery 31. The idling stop control unit 74 may execute the idling stop control. The automatic operation control unit 75 may execute an automatic operation control of the vehicle 11. In one implementation, the switch control unit 72 may serve as a "switch controller".

The ISG control unit 71 of the main controller 70 may output a control signal to the ISG controller 23, and thereby control the starter generator 16 to the powering state or a power-generation state. As used herein, the power-generation state may include a combustion power-generation state and a regenerative power-generation state as described later. For example, the ISG control unit 71 may control the starter generator 16 to the powering state, in restarting the engine 12 in the idling stop control, and in performing the assistance drive of the engine 12 at the time of the start or the acceleration. Moreover, as described later, in a case where the state of charge SOC of the lithium-ion battery 32 is low, the ISG control unit 71 may raise the power-generation voltage of the starter generator 16, and thereby control the starter generator 16 to the combustion power-generation state. In a case where the state of charge SOC of the lithium-ion battery 32 is high, the ISG control unit 71 may lower the power-generation voltage of the starter generator 16, and thereby control the starter generator 16 to a power-generation suspended state. It is to be noted that the combustion power-generation state of the starter generator 16 means a state in which the starter generator 16 is driven by the engine 12, to generate electric power.

The switch control unit 72 of the main controller 70 may output a control signal to the battery controller 42, and thereby control the switches SW1 and SW2 to the electrically conductive state or the cutoff state. For example, at the time of an engine initial start with the use of an undepicted starter motor, the switch control unit 72 may control both the switches SW1 and SW2 to the cutoff state, in order to supply electric power from the lead battery 31 to the starter motor as one of the electric loads 49. After the engine initial start by the starter motor, the switch control unit 72 may control the switch SW1 to the electrically conductive state, while controlling the switch SW2 to the cutoff state, in order to cause supplementary charge of the lead battery 31 by the starter generator 16. Upon an end of the supplementary charge of the lead battery 31 after the engine initial start, the switch control unit 72 may control both the switches SW1 and SW2 to the electrically conductive state. Moreover, as described later, in a powering control of the starter generator 16, the switch control unit 72 may control the switch SW1 to the electrically conductive state or the cutoff state, in accordance with a powering state of the starter generator 16. It is to be noted that the switch control unit 72 may control the switch SW2 to the cutoff state, in a case with occurrence of an abnormality in, for example, the lithium-ion battery 32.

The idling stop control unit 74 of the main controller 70 may execute the idling stop control. The idling stop control may include automatically causing a stop and a restart of the engine 12. The idling stop control unit 74 may exert, for example, a fuel cut, to stop the engine 12, in a case where a predetermined stop condition is satisfied during operation of the engine 12. The idling stop control unit 74 may cause starting rotation of the starter generator 16 to restart the engine 12, in a case where a predetermined start condition is satisfied during the stop of the engine 12. Non-limiting examples of the stop condition of the engine 12 may include that a vehicle speed is lower than a predetermined value, with a brake pedal being stepped down. Non-limiting examples of the start condition of the engine 12 may include that stepping down of the brake pedal is released, and that stepping down of an accelerator pedal is started.

As mentioned above, the main controller 70 may include the automatic operation control unit 75 that executes the automatic operation control of the vehicle 11. Moreover, to the main controller 70, coupled may be, for example, a front camera 76, a rear camera 77, and rear sideward radar 78. The front camera 76 may capture an image frontward of the vehicle. The rear camera 77 may capture an image rearward of the vehicle. The rear sideward radar 78 may detect an obstacle rearward of the vehicle. The automatic operation control unit 75 of the main controller 70 may monitor surrounding situations around the vehicle, on the basis of information from, for example, the cameras 76 and 77, and the radar 78, while automatically controlling steering and acceleration or deceleration of the vehicle 11 in accordance with the surrounding situations. In other words, the automatic operation control unit 75 may output control signals to, for example, the engine controller 60, the ISG controller 23, the mission controller 61, the brake controller 63, and the steering controller 65, and thereby control, for example, the power unit 13, the brake actuator 62, and the steering actuator 64 in accordance with the surrounding situations around the vehicle.

As described, the main controller 70 including the automatic operation control unit 75 may be provided as the electric loads 49 that constitute the electric load group 50. In other words, the automatic operation control unit 75 may be provided as one of the electric loads 49 provided in the first power supply system 51. In one implementation, the automatic operation control unit 75 may serve as an "operation controller". It is to be noted that the automatic operation control to be executed by the main controller 70 is not limited to a control in which the main controller 70 performs all of operations and monitoring of the surroundings, but may include an operation assistance control in which the main controller 70 performs part of the operations and the monitoring of the surroundings. Non-limiting example of the operation assistance control may include an adaptive cruise control, a lane keeping control, and an automatic braking control. The adaptive cruise control may include causing a vehicle to perform accelerated or decelerated travel while following a preceding vehicle. The lane keeping control may include, upon a vehicle deviating from a traveling lane, steering the wheels 20 to return the vehicle to the middle of the traveling lane. The automatic braking control may include, upon a vehicle coming close to an obstacle ahead of the vehicle, braking the wheels 20.

[Power-Generation Control of Starter Generator]

Figure 4:
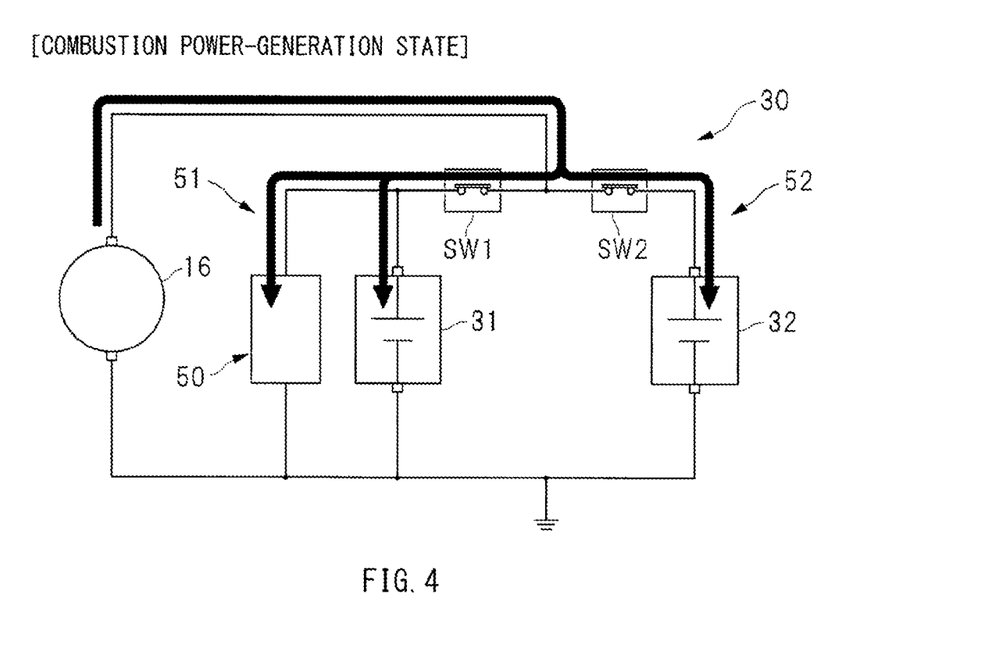
FIG. 4 describes an example of a power supply state, with a starter generator being controlled to a combustion power-generation state.
Figure 5:
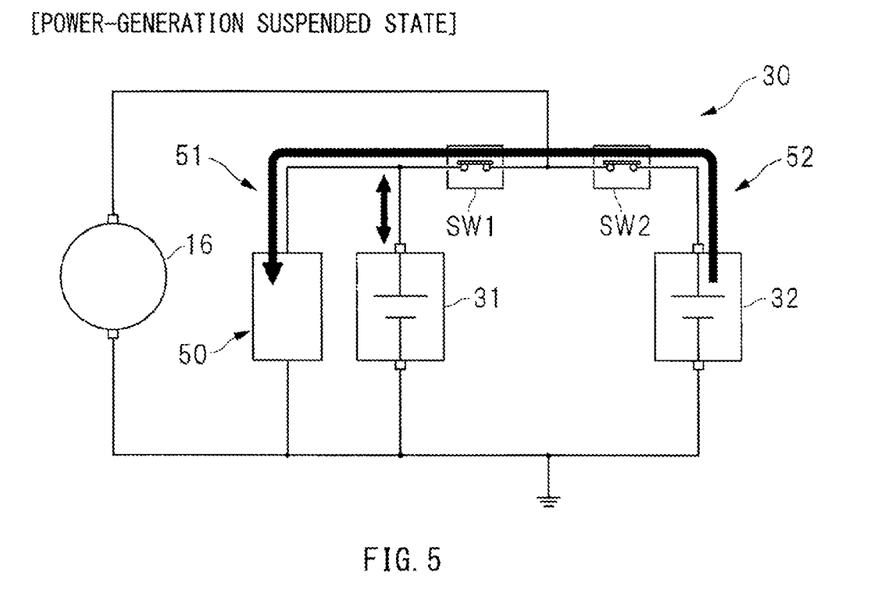
FIG. 5 describes an example of the power supply state, with the starter generator being controlled to a power-generation suspended state.
Figure 6:
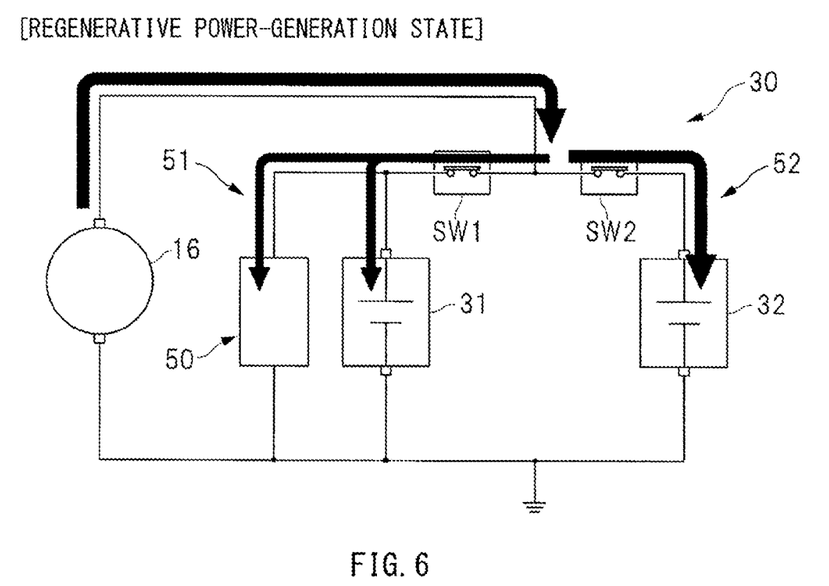
FIG. 6 describes an example of the power supply state, with the starter generator being controlled to a regenerative power-generation state.

A description is given of a power-generation control of the starter generator 16 by the main controller 70, and power supply states in accompaniment with the power-generation control of the starter generator 16. FIG. 4 illustrates one example of the power supply state, with the starter generator 16 being controlled to the combustion power-generation state. FIG. 5 illustrates one example of the power supply state, with the starter generator 16 being controlled to the power-generation suspended state. FIG. 6 illustrates one example of the power supply state, with the starter generator 16 being controlled to a regenerative power-generation state. It is to be noted that black arrows illustrated in FIGS. 4 to 6 represent the power supply states inside the power supply circuit 30.

Referring to FIG. 4, in a case where the electricity storage amount of the lithium-ion battery 32 has lowered, the starter generator 16 may be controlled to the combustion power-generation state. In other words, in a case where the state of charge SOC of the lithium-ion battery 32 is lower than a predetermined lower limit, the starter generator 16 may be controlled to the combustion power-generation state, in order to charge the lithium-ion battery 32 and to increase the state of charge SOC. In controlling the starter generator 16 to the combustion power-generation state, the power-generation voltage of the starter generator 16 may be raised to a greater value than the terminal voltage of the lithium-ion battery 32. This causes power-generated electric power to be supplied from the starter generator 16 to, for example, the lithium-ion battery 32, the electric load group 50, and the lead battery 31, as illustrated in FIG. 4.

Referring to FIG. 5, in a case where the electricity storage amount of the lithium-ion battery 32 is sufficient, the starter generator 16 may be controlled to the power-generation suspended state. In other words, in a case where the state of charge SOC of the lithium-ion battery 32 is higher than a predetermined upper limit, the starter generator 16 may be controlled to the power-generation suspended state, because the lithium-ion battery 32 is able to supply electric power to the electric load group 50. In controlling the starter generator 16 to the power-generation suspended state, the power-generation voltage of the starter generator 16 may be lowered to a smaller value than the terminal voltage of the lithium-ion battery 32. This causes electric power to be supplied from the lithium-ion battery 32 to, for example, the electric load group 50, as illustrated in FIG. 5. Hence, it is possible to suppress or stop power generation of the starter generator 16, and to reduce an engine load.

As mentioned above, the main controller 70 may control the starter generator 16 to the combustion power-generation state or the power-generation suspended state on the basis of the state of charge SOC. Meanwhile, on the decelerated travel, it is necessary to recover much kinetic energy, and to enhance fuel consumption performance. Therefore, on the decelerated travel, the starter generator 16 may be controlled to the regenerative power-generation state, and the power-generation voltage of the starter generator 16 may be raised within a range in which the power-generation voltage of the starter generator 16 is not higher than withstanding voltages of, for example, the lead battery 31, the lithium-ion battery 32, and the electric load group 50. This makes it possible to supply a large current from the starter generator 16 to the lithium-ion battery 32 and the lead battery 31, as illustrated in FIG. 6. In other words, it is possible to increase the power-generated electric power of the starter generator 16. It is therefore possible to actively convert the kinetic energy to electric energy, and recover the electric energy, leading to enhancement in energy efficiency of the vehicle 11 and enhancement in the fuel consumption performance. It is to be noted that because the internal resistance of the lithium-ion battery 32 is smaller than the internal resistance of the lead battery 31, most of the power-generated current is supplied to the lithium-ion battery 32.

As illustrated in FIGS. 4 to 6, in controlling the starter generator 16 to the combustion power-generation state, the regenerative power-generation state, and the power-generation suspended state, the switches SW1 and SW2 may be maintained in the electrically conductive state. In other words, in the vehicle control apparatus 10, it is possible to control the charge and the discharge of the lithium-ion battery 32, without making a switching control of the switches SW1 and SW2, solely by controlling the power-generation voltage of the starter generator 16. It is therefore possible to easily control the charge and the discharge of the lithium-ion battery 32, and to enhance durability of the switches SW1 and SW2.

[Powering Control of Starter Generator]

A description is given of a powering control of the starter generator 16 by the main controller 70, and a switch control in accompaniment with the powering control of the starter generator 16. In controlling the starter generator 16 to the combustion power-generation state, the regenerative power-generation state, and the power-generation suspended state as mentioned above, both the switches SW1 and SW2 may be controlled to the electrically conductive state. Meanwhile, in controlling the starter generator 16 to the powering state, current consumption of the starter generator 16 changes with the powering state. Therefore, the switch SW1 may be switched to the electrically conductive state or the cutoff state in accordance with the powering state.

Figure 7:
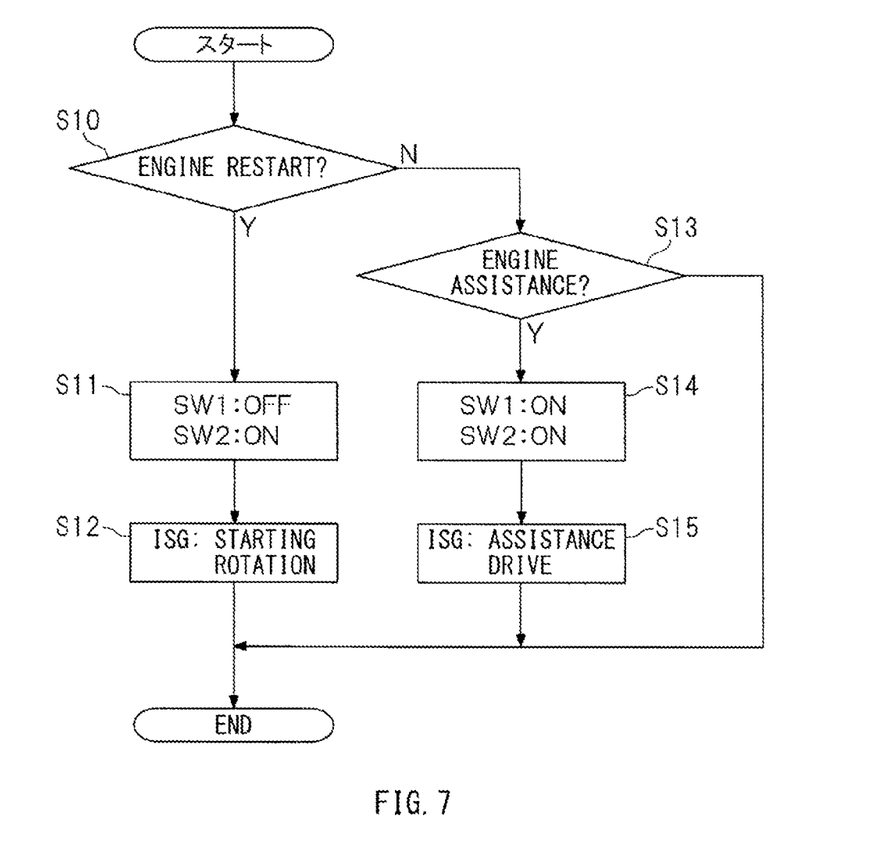
FIG. 7 is a flowchart illustrating an example of an execution procedure of a switch control.
Figure 8:
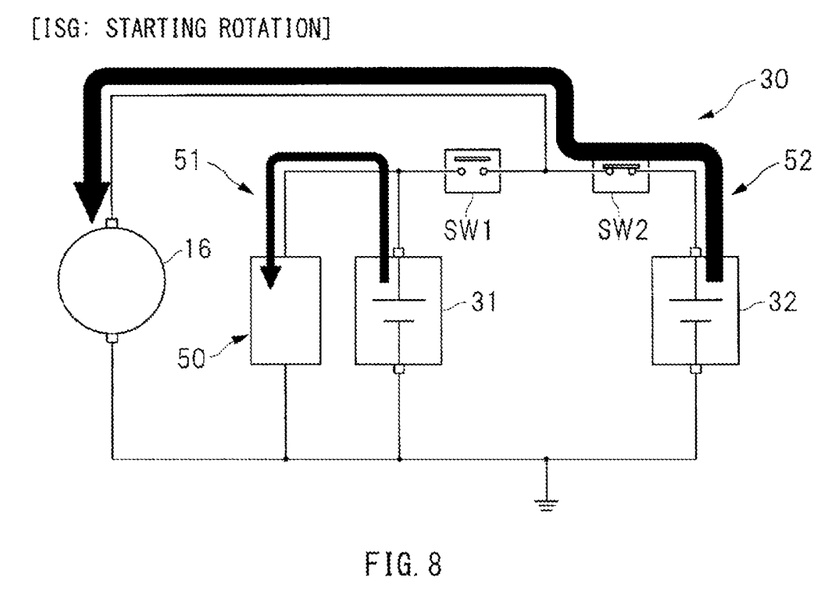
FIG. 8 describes an example of the power supply state, with the starter generator being brought to starting rotation.
Figure 9:
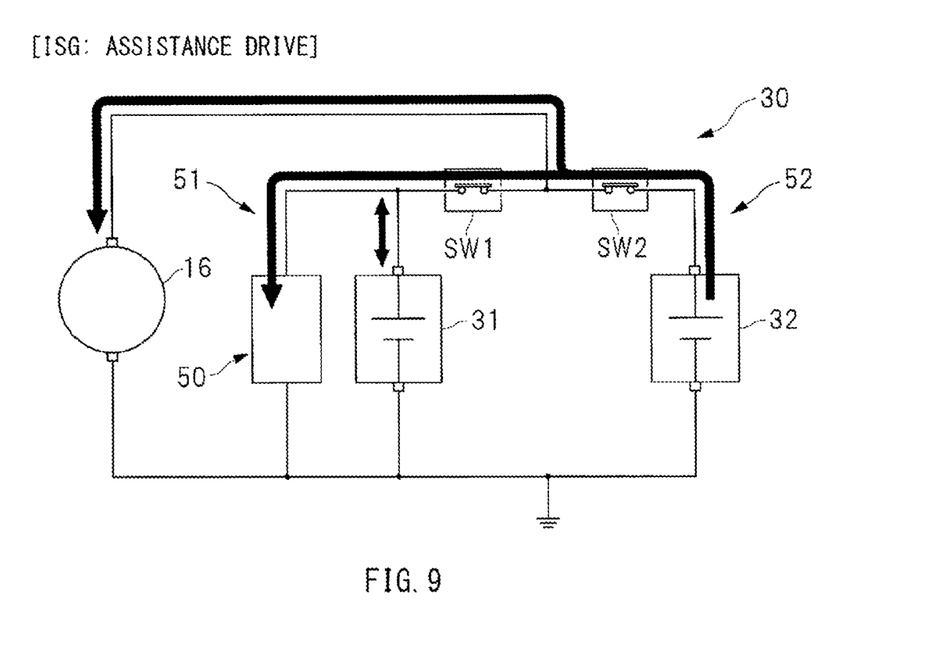
FIG. 9 describes an example of the power supply state, with the starter generator being brought to an assistance drive.
Figure 10:
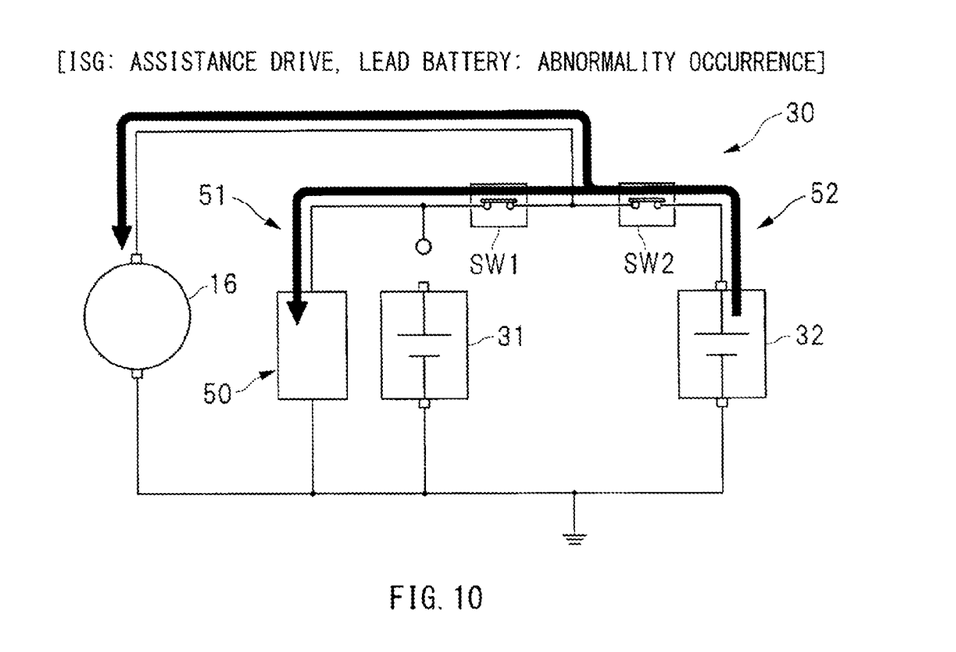
FIG. 10 describes an example of the power supply state, with the starter generator being brought to the assistance drive.

In what follows, described is the switch control in accompaniment with the powering control of the starter generator 16. The switch control may be executed by the main controller 70 on predetermined cycles. FIG. 7 is a flowchart illustrating one example of an execution procedure of the switch control. In FIG. 7, reference characters "ON" mean that the switch SW1 or SW2 is in the electrically conductive state, while reference characters "OFF" mean that the switch SW1 or SW2 is in the cutoff state. In FIG. 7, reference characters "ISG" mean the starter generator 16. FIG. 8 illustrates the power supply state, with the starter generator 16 being brought to starting rotation. FIGS. 9 and 10 illustrate the power supply states, with the starter generator 16 being brought to the assistance drive. It is to be noted that black arrows illustrated in FIGS. 8 to 10 represent the power supply states inside the power supply circuit 30.

Referring to FIG. 7, in step S10, a determination may be made as to whether or not a situation arises where an engine restart is likely to be made by the idling stop control. In other words, in step S10, a determination may be made as to whether or not the predetermined engine start condition is satisfied, during an engine stop by the idling stop control. For example, in step S10, in a case where the stepping down of the brake pedal is released, or in a case where the stepping down of the accelerator pedal is started, a determination may be made that the engine start condition is satisfied, and a determination may be made that the engine restart by the starter generator 16 is likely to be made. In a case where the determination has been made, in step S10, that the engine restart is likely to be made, the flow may proceed to step S11.

In step S11, the switch SW1 is controlled to the cutoff state, while the switch SW2 is controlled to the electrically conductive state. In subsequent step S12, the starter generator 16 causes execution of cranking as the starting rotation of the engine 12. In other words, in step S12, the starter generator 16 is controlled to the powering state to bring the engine 12 to the starting rotation from a stopped state. As illustrated in FIG. 8, in causing the starting rotation of the starter generator 16, the switch SW1 is switched from the electrically conductive state to the cutoff state, causing the first power supply system 51 and the second power supply system 52 to be isolated from each other. In other words, the first power supply system 51 and the second power supply system 52 are separated, even in a case where current consumption of the starter generator 16 rapidly increases in accompaniment with the starting rotation. This prevents a current flow from the lead battery 31 to the starter generator 16, allowing for appropriate electric power supply from the lead battery 31 to the electric load group 50. Hence, it is possible to prevent an instantaneous voltage drop with respect to the electric load group 50, allowing for appropriate functioning of the electric load group 50.

Moreover, as illustrated in FIG. 7, in step S10, in a case where a determination has been made that the engine restart is unlikely to be made, the flow may proceed to step S13. In step S13, a determination may be made as to whether or not the assistance drive of the engine 12 by the starter generator 16, i.e., an engine assistance, is likely to be performed. In step S13, the determination may be made on the basis of, for example, the vehicle speed, an amount of an accelerator operation, and the number of rotations of engine, as to whether or not the engine assistance is likely to be performed. For example, on low-speed travel such as a start, a determination may be made that the assistance drive by the starter generator 16 is likely to be performed, because allowing the starter generator 16 to perform the assistance drive makes it possible to effectively reduce an amount of fuel consumption of the engine 12. In step S13, in the case where the determination has been made that the engine assistance is likely to be performed, the flow may proceed to step S14.

In step S14, both the switches SW1 and SW2 are controlled to the electrically conductive state. In subsequent step S15, the assistance drive by the starter generator 16 is executed. In other words, in step S15, the starter generator 16 is controlled to the powering state to bring the engine 12 to an assisted drive from a rotating state. As illustrated in FIG. 9, in the assistance drive by the starter generator 16, the switch SW1 is kept in the electrically conductive state. This causes both the lead battery 31 and the lithium-ion battery 32 to be coupled to the electric load group 50. This allows for the appropriate functioning of the electric load group 50, even in a case with occurrence of an abnormality in the lead battery 31 as described later, leading to enhanced reliability of the vehicle control apparatus 10.

Current consumption in the assistance drive by the starter generator 16 is considerably reduced, as compared to current consumption in the starting rotation of the starter generator 16. In other words, the starting rotation of the starter generator 16 is a rotating state in which the starter generator 16 allows the stopped engine 12 to start rotating, i.e., a rotating state in which required motor torque is large and the current consumption of the starter generator 16 easily increases. In contrast, the assistance drive by the starter generator 16 is a rotating state in which the rotating engine 12 is auxiliarily driven by the starter generator 16, i.e., a rotating state in which the required motor torque is small and the current consumption of the starter generator 16 is reduced. As described, in the assistance drive by the starter generator 16, the current consumption of the starter generator 16 is reduced. Accordingly, no large current flows from the lead battery 31 to the starter generator 16, even if the switch SW1 is kept in the electrically conductive state. This allows for sufficient electric power supply from the lead battery 31 and/or the lithium-ion battery 32 to the electric load group 50.

As mentioned above, in a case of the assistance drive by the starter generator 16, the switch SW1 is kept in the electrically conductive state, causing both the lead battery 31 and the lithium-ion battery 32 to be coupled to the electric load group 50. This allows for the appropriate functioning of the electric load group 50, even in the case with the occurrence of the abnormality in the lead battery 31, leading to the enhanced reliability of the vehicle control apparatus 10. FIG. 10 illustrates a specific but non-limiting example with the occurrence of the abnormality in the lead battery 31, e.g., coming off of a terminal, during the assistance drive by the starter generator 16. Even in this case, it is possible to continue electric power supply from the lithium-ion battery 32 to the electric load group 50. This allows for the appropriate functioning of the electric load group 50, leading to the enhanced reliability of the vehicle control apparatus 10.

Moreover, as mentioned above, the electric loads 49 of the electric load group 50 may include the main controller 70 that executes the automatic operation control. Accordingly, it is possible to continue electric power supply from the lithium-ion battery 32 to the main controller 70, even in the case with the occurrence of the abnormality in the lead battery 31, e.g., the coming off of the terminal, during the assistance drive by the starter generator 16 in the automatic operation control. This makes it possible to continue the automatic operation control without abrupt cancelation of the automatic operation control, leading to enhanced reliability of the automatic operation control. It is to be noted that the electric loads 49 to be provided in the first power supply system 51 are not limited to the main controller 70 that executes the automatic operation control. It is to be appreciated that the electric loads 49 to be provided in the first power supply system 51 may include other controllers, actuators, or electric devices. In a case where the abnormality detector 73 of the main controller 70 detects an abnormal state of the lead battery 31 during the automatic operation control, a notice of cancelation of the automatic operation control may be made to an occupant, with the use of an alarm display or an alarm sound. Thus, operation authority may be appropriately transferred to the occupant.

As described, the switch SW1 is controlled to the cutoff state, in the case where the engine 12 is restarted by the starter generator 16. That is, the switch SW1 is controlled to the cutoff state, in the case where the starter generator 16 is controlled to the powering state to bring the engine 12 to the starting rotation from the stopped state. Hence, it is possible to prevent the instantaneous voltage drop with respect to the electric load group 50, even in the case with the rapid increase in the current consumption of the starter generator 16. This allows for the appropriate functioning of the electric load group 50. Meanwhile, the switch SW1 is controlled to the electrically conductive state, in the case where the starter generator 16 performs the assistance drive of the engine 12. That is, the switch SW1 is controlled to the electrically conductive state, in the case where the starter generator 16 is controlled to the powering state to bring the engine 12 to the assisted drive from the rotating state. This allows for the appropriate functioning of the electric load group 50, even in the case with the occurrence of the abnormality in the lead battery 31, leading to the enhanced reliability of the vehicle control apparatus 10.

According to one implementation of the technology, the switch SW1 is controlled to the electrically conductive state, in the case where the starter generator 16 is controlled to the powering state to bring the engine 12 to the assisted drive from the rotating state. Hence, it is possible for the vehicle control apparatus 10 to function appropriately, even in the case with the occurrence of the abnormality in the lead battery 31.

Although some implementations of the technology have been described in the forgoing with reference to the accompanying drawings, the technology is by no means limited to the implementations described above. Various changes and modifications may be made to any implementation without departing from the scope of the technology. In the forgoing description, the vehicle control apparatus 10 includes the switch SW2. However, this is non-limiting. For example, the switch SW2 may be eliminated from the vehicle control apparatus 10. In other words, it suffices to provide the vehicle control apparatus 10 with the switch SW1, from a viewpoint of isolation of the first power supply system 51 and the second power supply system 52 from each other. The first power supply system 51 includes the lead battery 31 and the electric load group 50. The second power supply system 52 includes the lithium-ion battery 32 and the starter generator 16. Therefore, the switch SW2 may be eliminated from the vehicle control apparatus 10. Moreover, in the illustrated implementations, the battery module 41 incorporates the switches SW1 and SW2. However, this is non-limiting. The switches SW1 and SW2 may be provided outside the battery module 41. Further, in the forgoing description, the switch SW2 is provided on the positive electrode line 34 of the lithium-ion battery 32. However, this is non-limiting. For example, the switch SW2 may be provided on the negative electrode line 38 of the lithium-ion battery 32, as indicated by an alternate long and short dashed line in FIG. 2.

In the forgoing description, the lead battery 31 is adopted as the "first electricity storage device", while the lithium-ion battery 32 is adopted as the "second electricity storage device". However, this is non-limiting. Other kinds of batteries or capacitors may be adopted. The first and the second electricity storage devices are not limited to different kinds of electricity storage devices, but may be the same kind of electricity storage devices. Moreover, in the forgoing description, the internal resistance of the second electricity storage device is smaller than the internal resistance of the first electricity storage device. However, this is non-limiting. The internal resistance of the second electricity storage device may be greater than the internal resistance of the first electricity storage device. In another alternative, the internal resistance of the second electricity storage device may be equal to the internal resistance of the first electricity storage device.

In the forgoing description, the starter generator 16 is adopted as the "electric motor". However, this is non-limiting. A motor generator may be adopted as the "electric motor", or alternatively, a starter motor may be adopted as the "electric motor". Moreover, in the forgoing description, the main controller 70 includes the switch control unit 72 and the automatic operation control unit 75. However, this is non-limiting. For example, the switch control unit and/or the automatic operation control unit may be provided in another controller or other controllers. Further, in the forgoing description, the automatic operation control unit 75 of the main controller 70 exemplifies the "operation controller" that executes the automatic operation control. However, this is non-limiting. For example, the ISG controller 23, the engine controller 60, the mission controller 61, the brake actuator 62, the brake controller 63, the steering actuator 64, or the steering controller 65, or any combination thereof may serve as the "operation controller" that executes the automatic operation control.

In the forgoing description, the abnormality in the lead battery 31 is exemplified by the coming off of the terminal. However, this is non-limiting. Whatever hinders the lead battery 31 from sufficiently discharging may be the abnormality in the lead battery 31. Non-limiting examples of the abnormality in the lead battery 31 may include a disconnection or a shortcircuit of the positive electrode line 33 and the negative electrode line 37 coupled to the lead battery 31, an excessive increase in a temperature of the lead battery 31, and an excessive decrease in the state of charge SOC of the lead battery 31.

The main controller 70 illustrated in FIGS. 1 and 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 70. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the main controller 70 illustrated in FIGS. 1 and 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle control apparatus to be mounted on a vehicle including an engine, the vehicle control apparatus comprising:
   a first power supply system including a first electricity storage device and an electric load, wherein the electric load is coupled to the first electricity storage device;
   a second power supply system including an electric motor and a second electricity storage device, wherein the electric motor is coupled to the engine, and the second electricity storage device is coupled to the electric motor;
   a switch switchable between an electrically conductive state and a cutoff state, wherein the switch in the electrically conductive state causes the first power supply system to electrically connect to the second power supply system, and wherein the switch in the cutoff state causes the first power supply system to electrically isolate from the second power supply system; and
   a switch controller that:
      causes, when determining that a restart of the engine being in an idling stop by the electric motor is executed, the switch to be in the cutoff state; and
      causes, when determining that the restart of the engine is not executed, and that an engine assistance in which the engine that is rotating on a travel of the vehicle is auxiliary driven by the electric motor is executed, the switch to be in the electrically conductive state,
   wherein current consumption of the electric motor in the engine assistance is less than current consumption of the electric motor in the restart of the engine.

2. The vehicle control apparatus according to claim 1, wherein
   the electric motor is a generator motor, and
   the switch controller causes the switch to be in the electrically conductive state on a condition that the generator motor is controlled to a power-generation state.

3. The vehicle control apparatus according to claim 2, wherein
   the switch controller causes the switch to be in the electrically conductive state on a condition that the generator motor is controlled to a power-generation suspended state.

4. The vehicle control apparatus according to claim 3, wherein the electric load is an operation controller that monitors surrounding situations around the vehicle while automatically controlling steering and acceleration or deceleration of the vehicle in accordance with the surrounding situations.

5. The vehicle control apparatus according to claim 2, wherein the electric load is an operation controller that monitors surrounding situations around the vehicle while automatically controlling steering and acceleration or deceleration of the vehicle in accordance with the surrounding situations.

6. The vehicle control apparatus according to claim 1, wherein
   the electric motor is a generator motor, and
   the switch controller causes the switch to be in the electrically conductive state on a condition that the generator motor is controlled to a power-generation suspended state.

7. The vehicle control apparatus according to claim 6, wherein the electric load is an operation controller that monitors surrounding situations around the vehicle while automatically controlling steering and acceleration or deceleration of the vehicle in accordance with the surrounding situations.

8. The vehicle control apparatus according to claim 1, wherein the electric load is an operation controller that monitors surrounding situations around the vehicle while automatically controlling steering and acceleration or deceleration of the vehicle in accordance with the surrounding situations.

9. The vehicle control apparatus according to claim 1,
   wherein the switch controller determines that the restart of the engine is executed based on at least one of an operation of the brake pedal and an operation of the accelerator pedal, and
   wherein the switch controller determines that the engine assistance is executed based on at least one of a number of rotations of the engine, a speed of the vehicle and an amount of an accelerator operation of the vehicle.

10. The vehicle control apparatus according to claim 1,
   wherein the switch controller determines, on a low-speed travel of the vehicle, whether or not the engine assistance is executed.

11. A vehicle control apparatus to be mounted on a vehicle including an engine, the vehicle control apparatus comprising:
   a first power supply system including a first electricity storage device and an electric load, wherein the electric load is coupled to the first electricity storage device;

a second power supply system including an electric motor and a second electricity storage device, wherein the electric motor is coupled to the engine, and the second electricity storage device being coupled to the electric motor;

a switch switchable between an electrically conductive state and a cutoff state, wherein the switch in the electrically conductive state causes the first power supply system to electrically connect to the second power supply system, and wherein the switch in the cutoff state causes the first power supply system to electrically isolate from the second power supply system; and circuitry that:
  causes, when determining that a restart of the engine being in a idling stop by the electric motor is executed, the switch to be in the cutoff state; and
  causes, when determining that the restart of the engine is not executed, and that an engine assistance in which the engine that is rotating on a travel of the vehicle is auxiliary driven by the electric, motor is executed, the switch to be in the electrically conductive state,
  wherein current consumption of the electric motor in the engine assistance is less than current consumption of the electric motor in the restart of the engine.

12. The vehicle control apparatus according to claim 11,
wherein the circuitry determines that the restart of the engine is executed based on at least one of an operation of the brake pedal and an operation of the accelerator pedal, and wherein the circuitry determines that the engine assistance is executed based on at least one of a number of rotations of the engine, a speed of the vehicle and an amount of an accelerator operation of the vehicle.

13. The vehicle control apparatus according to claim 11,
wherein the circuitry determines, on a low-speed travel of the vehicle, whether or not the engine assistance is executed.

* * * * *